Figure 1:
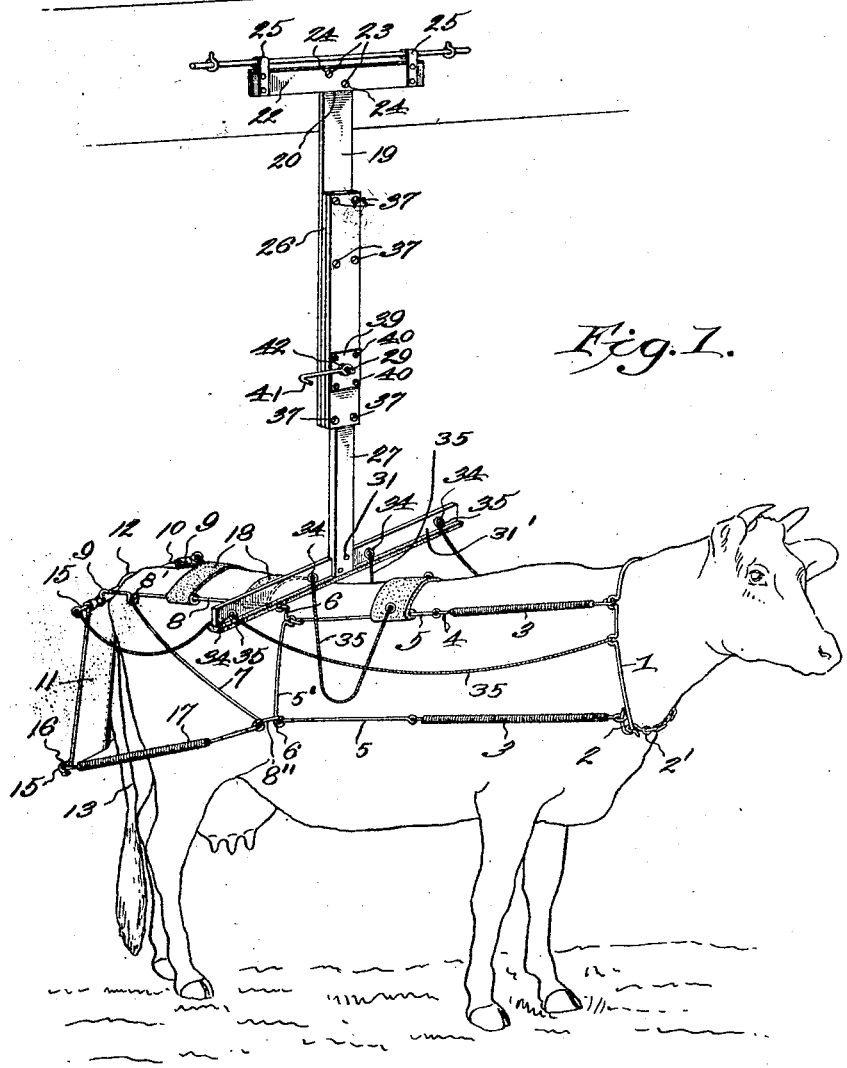

Jan. 15, 1924.

F. G. ZIMMERMAN

RESTRAINING DEVICE

Filed Sept. 8, 1922

1,481,174

2 Sheets-Sheet 1

F. G. Zimmerman,
INVENTOR

BY Victor J. Evans
ATTORNEY

Jan. 15, 1924.   1,481,174
F. G. ZIMMERMAN
RESTRAINING DEVICE
Filed Sept. 8, 1922   2 Sheets-Sheet 2

Patented Jan. 15, 1924.

1,481,174

UNITED STATES PATENT OFFICE.

FRED G. ZIMMERMAN, OF CLOVERDALE, CALIFORNIA.

RESTRAINING DEVICE.

Application filed September 8, 1922. Serial No. 586,923.

*To all whom it may concern:*

Be it known that I, FRED G. ZIMMERMAN, a citizen of the United States, residing at Cloverdale, in the county of Sonoma and State of California, have invented new and useful Improvements in Restraining Devices, of which the following is a specification.

This invention relates to improvements in restraining devices and has for its principal object to provide a harness which is placed over the body of an animal and which includes a grooved metallic plate connected thereto which is adapted to engage the posterior extremity of the animal to teach her sanitary rules while in the milking room.

Another and important object is to produce a device of this character which will not permit a cow to discharge excrement without soiling her posterior extremities and because of such unpleasantness will break the animal from such act when the device is positioned at milking time and further to prevent the cow switching her tail into the bucket at the milking period.

A further object of the invention is to provide a restraining device consisting of means suspended from a ceiling and contacting with the center of an animal's back and means for connecting the same to the harness for teaching the animal sanitary rules while in the milking room.

A still further object of the invention is to produce a restraining device consisting of an adjustable slide which is suspended from a ceiling and connected with the harness so as to contact with the animal's back at the center thereof.

This invention also consists in certain other features of construction and in the combination and arrangement of the several parts, to be hereinafter fully described illustrated in the accompanying drawings and specifically pointed out in the appended claims.

In describing my invention in detail reference will be had to the accompanying drawings wherein like characters of reference denote like or corresponding parts in the several views, and in which:—

In the drawings:—

Figure 1 is a side elevation of the invention as applied to an animal.

The remaining figures are detail views.

Referring now to the drawings wherein like characters of reference denote corresponding parts 1 indicates a yoke formed of spring metal which is designed to be placed over the neck of an animal at the shoulders thereof, and which has its lower ends bent to form eyes 2 to receive a link 2' which is arranged transversely on the neck of the animal at the lower end thereof to engage said eyes for holding said yoke thereon.

Coil springs 3 extend longitudinally over the shoulders of the cow and have their forward ends connected to said yoke and their opposite or rear ends hooked as at 4 to engage a plurality of short strips 5 which are connected at the opposite end by transverse strips 5'. The strips 5' are bent upon themselves adjacent their ends as at 6 and the lower ends of the strip 5' extend upwardly toward the back of the animal as at 7. These strips 5' have their upper ends hooked as at 7' to engage a pair of hooked wire elements 8 which are bent intermediate their ends to form hooks 8' to be engaged by the upwardly extended portion 7 and are bent adjacent their ends to form hooks 9 which engage apertures 10 formed in a plate 11 preferably made of metal or any weather proof material which has a longitudinally extending groove 12 formed centrally thereof to engage the tail 13 of the animal.

A pair of steel pins 15 are arranged transversely of the metallic plate 11 at the ends thereof and have their outer ends hooked as at 16. The lower pin 15 is adapted to receive one end of the coil springs 17 arranged on each side of the animal at the rear thereof, said springs have their opposite ends connected to the hooked ends of the wire elements 8" which are formed in the strips 5'. Cushioned leather strips 18 are arranged transversely on the animal's back for connecting the sides of the harness together.

An elongated strip of wood 19 has one side of the upper portion thereof cut away as at 20 to receive a cross member 22. Fastening elements 24 are adapted for connecting the cross member with said strip. Metal hooks 25 are provided on said cross member for engaging a rod suspended from a support or the ceiling for suspending the elongated strip therefrom, at a right angle to fit directly over the center of the animal's back.

Guideways 26 are provided on the elongated strip to receive a slide 27 which has a longitudinal slot 28 formed centrally thereof for engaging a screw 29 which passes through the elongated strip. The slide has its lower portion on one side thereof cut away as to 30 which is provided with openings 31. A cushion cross strip 31' has openings formed centrally therein and an elongated groove 32 is formed on one side thereof for engaging the cutaway portion of the slide. Fastening elements such as screws or bolts 33 pass through said openings for holding these parts in associated position. A plurality of screw eyes 34 are provided in the cross strip for receiving ropes 35 and the ends of said ropes engage the harness which is positioned on the back of the animal for holding said cross strip centrally disposed with respect to the animal for teaching said animal sanitary rules while in the milking room. Some of said ropes have their ends secured to the upper pin 15 and the yoke 1 respectively. An elongated cover strip is securely connected to the guideways by screws 37 which pass through openings 38 formed in said strip. A rectangular metal plate 39 is securely attached to the cover strip by means of screws 40, said plate has a central opening formed therein to receive one end of the screw 29. A crank handle 41 has an enlarged head 42 formed on one end thereof and is adapted to engage the projecting end of the screw 29 for holding the cushioned cross strip, through the medium of the slide, adjustably associated with respect to the back of the animal.

Before leading the animal into the milking room the harness including the metallic plate is placed on her and when the animal reaches the milking room she is led to the adjustable sliding member which is suspended from the ceiling and the same is connected to the harness at the center of the cow's back, which will make it both difficult and disagreeable for her to discharge her excrement while in the milking room. The grooved rectangular plate is designed to engage the cow's tail to keep her from switching or swaying the same from side to side and thereby preventing her tail from coming into contact with the milking pail.

In urinating it is well known that a cow raises the center of her back and spreads her hind legs. The adjustable bar across the cow's back will prevent such movement as it retains the back of the animal in normal position.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A restraining device comprising a harness, an adjustable slide suspended from a ceiling and centered upon the back of an animal, a grooved plate carried by the rear end of the harness, and ropes passing through the slide and having their ends secured to the plate and to the harness respectively for the purpose specified.

2. A restraining device comprising a harness formed of spring metal and a rectangular plate having a groove formed centrally thereof engaging the posterior extremity of an animal and means for holding said plate in position, coil springs connecting said harness to the plate to provide a moderate tension at the lower end of the latter, a slidable member suspended from a ceiling and means for adjusting said slide for centering the same on the cow's back as and for the purpose specified.

3. A restraining device comprising a harness, a grooved rectangular plate carried by the rear end of the harness, an adjustable slide depending from a support, a cushioned elongated strip connected to the lower end of said slide and ropes connected with the plate and being adapted for associating the elongated strip with the back of an animal.

4. A restraining device comprising a harness formed of wire and a rectangular grooved plate connected to said harness for engaging the posterior extremity of an animal, an adjustable slide consisting of an elongated strip, guiding strips provided thereon and a cross member connected to the upper portion of said elongated strip, hooks provided on said cross member for engaging a bar for suspending the same from a ceiling, a sliding strip having an elongated slot therein passing through said guideways, a cushioned strip connected to the lower portion of said slide and arranged transversely thereof and means for adjusting said slide for securing the same on the back of an animal.

In testimony whereof I affix my signature.

FRED G. ZIMMERMAN.